US009063950B2

(12) United States Patent
Florence et al.

(10) Patent No.: US 9,063,950 B2
(45) Date of Patent: Jun. 23, 2015

(54) METHODS AND SYSTEMS FOR MODIFYING RASTER GRAPHICS SOFTWARE PROGRAMS

(75) Inventors: Edward Florence, Toronto (CA); Garvan Keeley, Toronto (CA); Ilya Varaev, Keswick (CA); Michael Yakubovsky, Toronto (CA); Andrew Patterson, Toronto (CA)

(73) Assignee: AVENZA SYSTEMS INC., Toronto, Ontario (CA)

( * ) Notice: Subject to any disclaimer, the term of this patent is extended or adjusted under 35 U.S.C. 154(b) by 1204 days.

(21) Appl. No.: 11/977,274

(22) Filed: Oct. 24, 2007

(65) Prior Publication Data

US 2008/0104522 A1 May 1, 2008

Related U.S. Application Data

(60) Provisional application No. 60/854,962, filed on Oct. 27, 2006.

(51) Int. Cl.
*G06F 17/30* (2006.01)

(52) U.S. Cl.
CPC .... *G06F 17/30241* (2013.01); *G06F 17/30265* (2013.01)

(58) Field of Classification Search
USPC ............................ 382/113, 309, 311; 715/746
See application file for complete search history.

(56) References Cited

U.S. PATENT DOCUMENTS

| 5,659,639 | A  | * | 8/1997 | Mahoney et al. | 382/309 |
|---|---|---|---|---|---|
| 5,864,632 | A  | * | 1/1999 | Ogawa et al. | 382/113 |
| 6,181,836 | B1 | * | 1/2001 | Delean | 382/302 |
| 6,246,417 | B1 | * | 6/2001 | Kambe et al. | 345/619 |
| 7,512,265 | B1 | * | 3/2009 | Skirko | 382/162 |
| 7,528,938 | B2 | * | 5/2009 | Garceau et al. | 356/4.01 |
| 7,792,331 | B2 | * | 9/2010 | Balaga et al. | 382/113 |
| 2004/0172418 | A1 | * | 9/2004 | Dorum et al. | 707/104.1 |
| 2005/0073532 | A1 | * | 4/2005 | Scott et al. | 345/634 |
| 2006/0041375 | A1 | * | 2/2006 | Witmer et al. | 701/208 |
| 2007/0168370 | A1 | * | 7/2007 | Hardy | 707/101 |

* cited by examiner

*Primary Examiner* — Vikkram Bali
(74) *Attorney, Agent, or Firm* — Preti Flaherty Beliveau & Pachios LLP (57) ABSTRACT

A method for enabling raster image editing software to work with geospatial imagery includes identifying geospatial metadata for an image upon opening of the image, and monitoring all raster image editing operations performed on the image to determine if the geospatial metadata is affected. The geospatial metadata is updated if the geospatial metadata is affected by a raster image editing operation. In another aspect, a computer readable medium contains instructions for controlling a computer system to perform a method for enabling raster image editing software to work with geospatial imagery.

18 Claims, 8 Drawing Sheets

METHODS AND SYSTEMS FOR MODIFYING RASTER GRAPHICS SOFTWARE PROGRAMS

CROSS REFERENCES TO RELATED APPLICATIONS

This application claims the benefit of U.S. Provisional Application No. 60/854,962, filed Oct. 27, 2006.

BACKGROUND OF THE INVENTION

The present invention generally relates to software, systems, and/or methods for modifying a conventional raster graphics software program so as to provide a geospatial geo-referenced environment with or without enhanced geo-spatial functionality. For the purpose of this invention, the term "enhanced geo-spatial functionality" means functionality and/or processes commonly performed on geo-spatial imagery but not normally performed on non-geo-spatial imagery. More specifically, the invention relates to a geospatial framework for raster image editing applications such as Adobe Photoshop that provides underlying support for geospatial imagery and in addition introduces a number of specific geospatial functions to this otherwise non-geospatial environment.

Previously the ability to recognize and work with geospatial imagery such as aerial photos, satellite photos or map scans was confined to a small number of highly specialized and high-priced spatial image processing systems such as ER Mapper and ERDAS Imagine.

Applications such as these are primarily geared to geographic operations only and, while able to recognize, open, manipulate and export images of a spatial nature, lack the complex and sophisticated functionality of conventional raster image editing applications such as Adobe Photoshop, Corel Photo-Paint and Paint Shop Pro.

Products like Adobe Photoshop, Corel Photo-Paint and Paint Shop Pro are targeted at graphics design professionals and others who wish to edit and manipulate basic raster images such as those taken with a digital camera or created from a scanning operation. While these applications have very comprehensive and sophisticated image editing capabilities they all lack the ability to work with images of a geospatial nature in a way that preserves the geospatial data integrity of the image. These applications also lack additional geospatial functionality provided by the present invention.

SUMMARY OF THE INVENTION

This invention enables users for the first time to use conventional raster image editing software to work with geospatial imagery without losing the geospatial properties of the image and also allows, for the first time, certain specialized geospatial functions and actions to be performed on such imagery in conventional raster imaging software. Conversely, it allows the advanced image editing functions, only available in raster graphic design applications, to be used with geospatial imagery.

DETAILED DESCRIPTION OF THE INVENTION

The present invention relates to a software application for enabling conventional raster image editing software to be used with a geospatial image without losing the geospatial properties of the image. In one embodiment, the software comprises a multi-component plugin to the graphic design application Adobe Photoshop. There is, however, no reason why such a solution could not implement this technology on other raster graphic design applications such as Corel Photo Paint or Paint Shop Pro or others.

In order to keep the geo-referencing information of a geospatial image in synchronization, the present invention includes a component for maintaining geospatial metadata within a raster graphics application. This component allows users to seamlessly perform common image editing tasks while synchronizing the metadata thus ensuring that no matter what operation has been performed on the image any actions that affect the spatial geometry of the image are immediate and seamlessly reflected and updated in the spatial metadata.

By using the metadata system to maintain geospatial data, the software insures that no matter what operation a user performs, their georeferencing will always be correct. This data can then be used to export geospatial images as well as provide a framework on which more advanced GIS (geographic information system) or cartographic functionality could be added.

Within this geospatial metadata framework, the software further includes a component for recognizing geospatial imagery and metadata upon opening of an image, storing the geospatial data, recognizing when operations performed on the image require changes to the metadata, computing the necessary changes, synchronizing the changes with the geospatial data and exporting the geospatial data both on its own and in conjunction with a saved or exported image.

Additionally, within conventional raster graphics software, specifically Adobe Photoshop, the software includes a component for separately importing and assigning geospatial metadata to images that do not already have such metadata, a component for performing complex geographic image re-projection, a component for automatically joining multiple spatial images together based upon their position on the earth, more commonly known as mosaicking, and a component for automatically splitting a single spatial image into multiple spatial images, more commonly known as tiling.

The component for maintaining and synchronizing the geospatial metadata works by monitoring all relevant raster image editing operations (i.e., operations the user performs within the graphics design application). At each step the user performs, this component determines whether or not the operation has altered anything that could affect the data being maintained. For geospatial data, the software watches any operation that could affect the image's size, resolution and orientation or more generally, any operation that affects the geometry of the image. If the user performs any operation that does in fact alter the image's geospatial meaning, the software then updates or recalculates the image's geo-spatial metadata based on the operation. An example of this would be a case where a particular geospatial image, such as a satellite photo of Manhattan, was cropped to a section of only Times Square. The geospatial metadata for that image would contain details as to where that image belongs geographically on the earth and how the contents of the image relate to the earth. This information would usually provide information as to the location of the corners of the image in earth units (e.g., degrees of latitude and longitude, or meters) as well as the pixel size or scale (the amount of earth represented by one image pixel) and any associated angle of rotation. While initially these values indicate the extents of the Manhattan image, they would change as the image was cropped. In this example, only the extents will have changed (the pixel size and rotation remain the same) so the new, cropped image would require new values to indicate where it lies on the earth. The software would monitor all user actions within the application, evaluate each one as to whether or not it affected the geospatial metadata data and the perform the calculations necessary to ensure that the new values were correct and updated. While this system is targeted at geospatial data, it is possible that someone could use this technique in order to maintain other forms of data that may be associated with an image.

In order to allow the user to work with geospatial imagery, the software monitors any documents that are opened within the application and checks to see if they have geospatial data attached. If the document itself contains geospatial data, or if it has some related geospatial data present in another file, the component for maintaining metadata described above is initiated for that particular document. It is also possible for the user to open a document and at a later time attach georeferencing, in which case the software will apply those geospatial parameters and start monitoring operations from that time insofar as they relate to the maintenance and synchronization of the geospatial data component.

Specifically a system implementing the software contains monitors of several types that constantly observe all user interaction. One type monitors all menu activity, another monitors all undo and redo states, a third monitors all palette operations, and a fourth monitors all tool and toolbar operations.

The system watches for any save operations performed on the document, and when one is performed it then outputs the georeferencing to the same place it was originally loaded from or prompts the user to save it to a new location.

Figure 1:
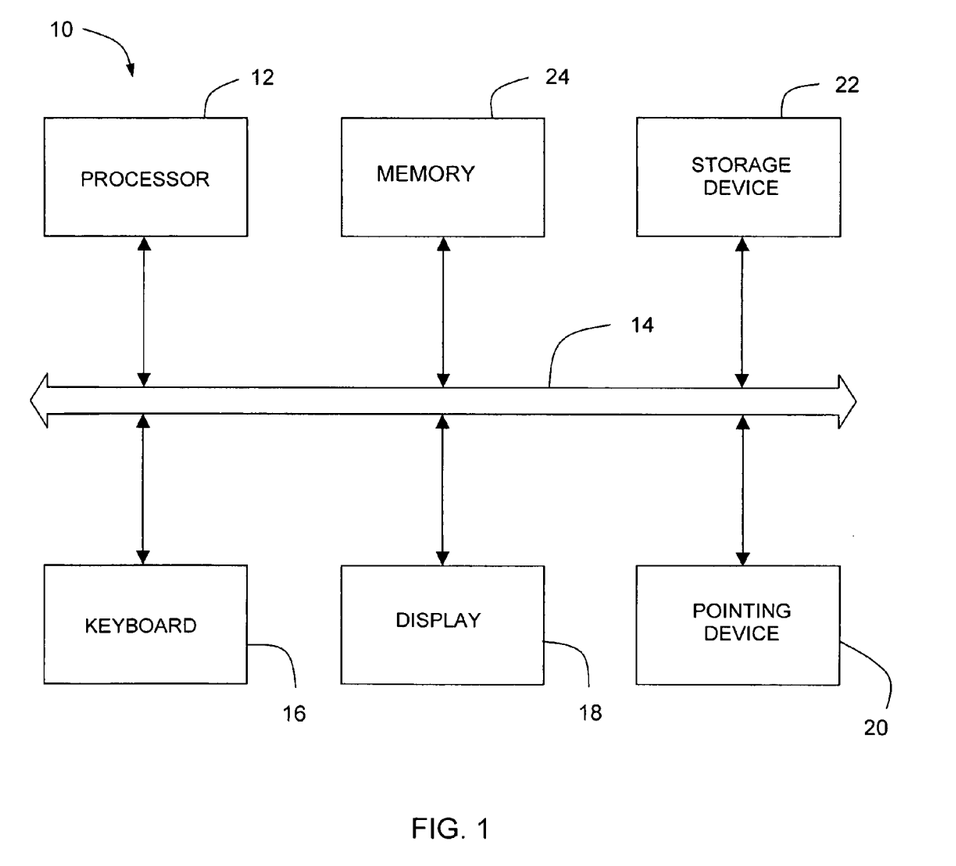
FIG. 1 is a block diagram of a computer system for implementing a software program for enabling raster image editing software to work with geospatial imagery.

Referring now to the drawings wherein identical reference numerals denote the same elements throughout the various views, FIG. 1 shows a block diagram of a computer system 10 that can be used to implement the software described above. The computer system 10 contains a processor 12 that communicates with other elements of the computer system 10 over a system bus 14. A keyboard 16 allows a user to input information into the computer system 10, and a display 18 allows the computer system 10 to output information to the user. A pointing device 20 is provided for moving the cursor or pointer on the display 18 and inputting information. The pointing device 20 is typically a mouse, but can also be a touch pad or a button device commonly used in laptop computers. A storage device 22 is used to store data and programs within the computer system 10. A memory 24, also attached to the system bus 14, contains an operating system.

With any implementation, the software described above can be loaded into the computer system 10 via a removable computer readable medium (such as a floppy disk, CD-ROM or the like) inserted into the appropriate drive of the computer system 10 and accessed from there. Alternatively, the software could be accessed from the removable computer readable medium inserted into the appropriate drive. The software could also be accessed via the Internet or another computer network. As used herein, the term "computer-readable medium" refers generally to any medium from which stored data can be read by a computer or similar unit. This includes not only removable media such as the aforementioned floppy disk and CD-ROM, but also non-removable media such as a hard disk or integrated circuit or flash memory device. While one exemplary computer system has been described for purposes of illustration, it should be noted that the present invention is not limited to implementation on this particular system. One skilled in the art will recognize that many other systems are possible.

Figure 2:
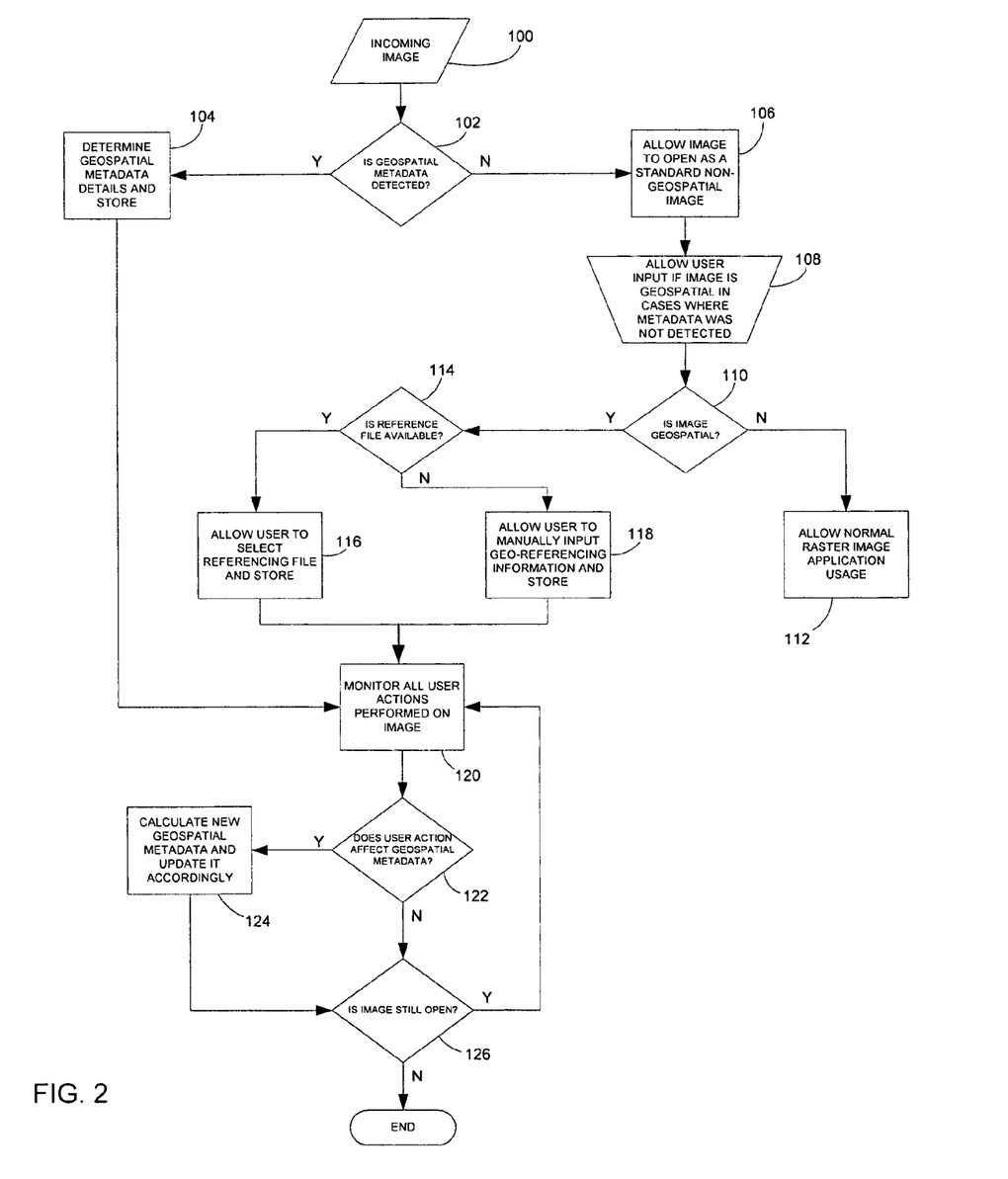
FIG. 2 is a flow chart depicting one embodiment of a method for modifying a conventional raster graphics software program.

FIG. 2 is a flow chart depicting the operation of the software. The process begins when a new image or document is opened at block 100. The software first determines if the image or document contains detectable geospatial metadata at block 102. If geospatial metadata is detected, the software determines and stores the details of the geospatial metadata at block 104. If geospatial metadata is not detected, the software allows the image to open as a standard non-geospatial image at block 106. At this point, the user is able to input at block 108 whether or not the image is a geospatial image lacking detectable geospatial metadata. If the image is not geospatial, as determined at block 110, then the plugin software allows normal operation of the raster image editing software without initiating the geospatial monitoring and maintenance functions at block 112.

If the user does input that the image is a geospatial image lacking detectable geospatial metadata, the software then determines if a geo-referencing file is available for the image at block 114. If yes, the user is allowed to select the geo-referencing file, which the software then stores at block 116. If no, the user is allowed to manually input appropriate geo-referencing data for the image, which the software then stores at block 118.

At this point, or after the software has stored the details of detected geospatial metadata as discussed above, the software monitors all user actions performed on the image at block 120. If a user action affects the geospatial metadata, as determined at block 122, the software calculates new geospatial metadata and updates it accordingly at block 124. These monitoring and maintenance functions are continued for as long as the image is opened, as depicted at block 126.

FIG. 3 depicts selected screenshots of the invention in one embodiment. FIGS. 3A and 3B illustrate one manner in which the presence or absence of an image's geospatial metadata, and the contents of that data if present, is conveyed to the user. FIG. 3A indicates how this information would be conveyed to the user if no geospatial metadata were present for an image. FIG. 3B shows how this information would be conveyed to the user if geospatial metadata were present for an image and further displays the contents of that metadata in terms of a) the name of the reference file containing the geospatial metadata, b) the specific co-ordinate system or geographic projection of the image, c) the image's mode vis-à-vis its state regarding editing of the geospatial metadata, d) the location of the northwest and southeast corners of the image in earth units, e) the size of the image in pixels, f) the size of each pixel in earth units such as degrees, meters or kilometers, g) the angle of rotation of the image.

Figure 3A:
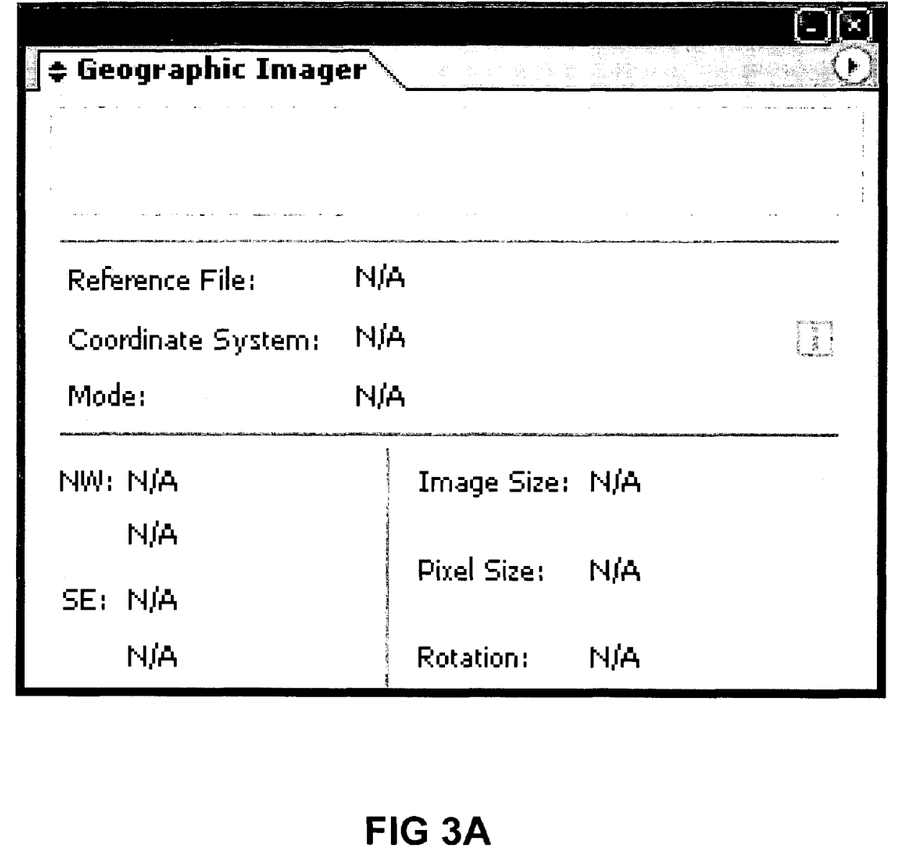
FIGS. 3A-3F show various screen shots from one embodiment of the present invention.
Figure 3B:
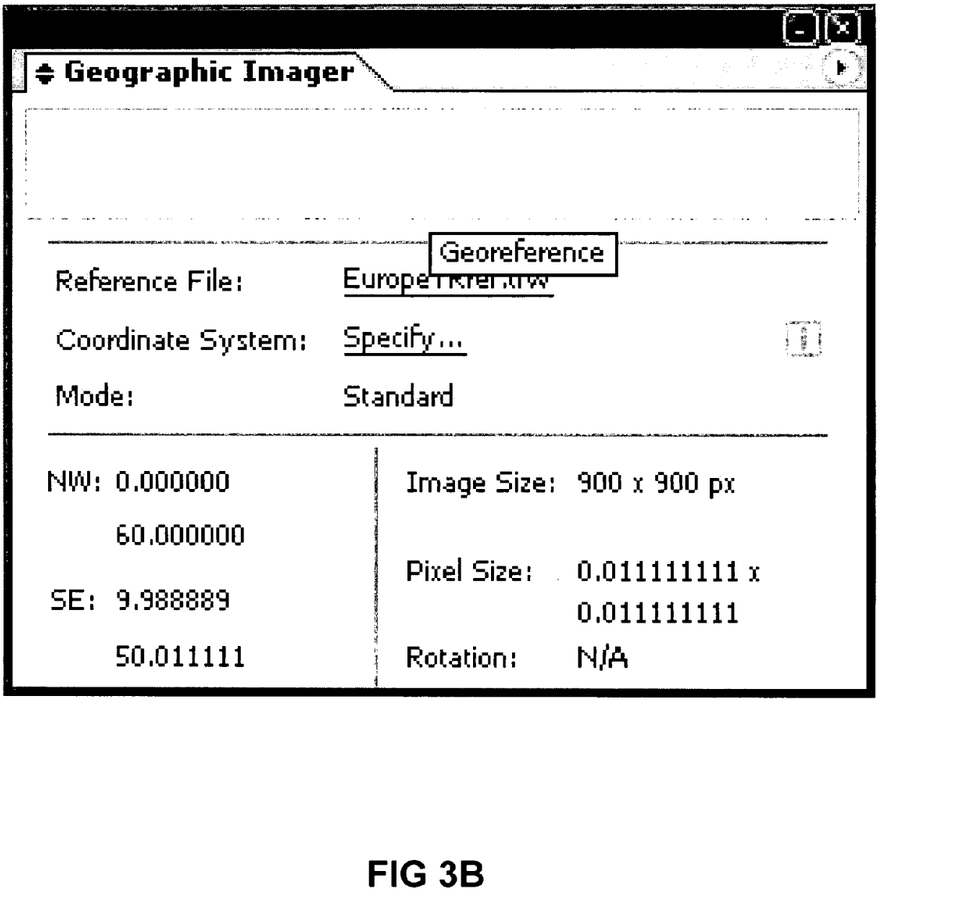
Figure 3C:
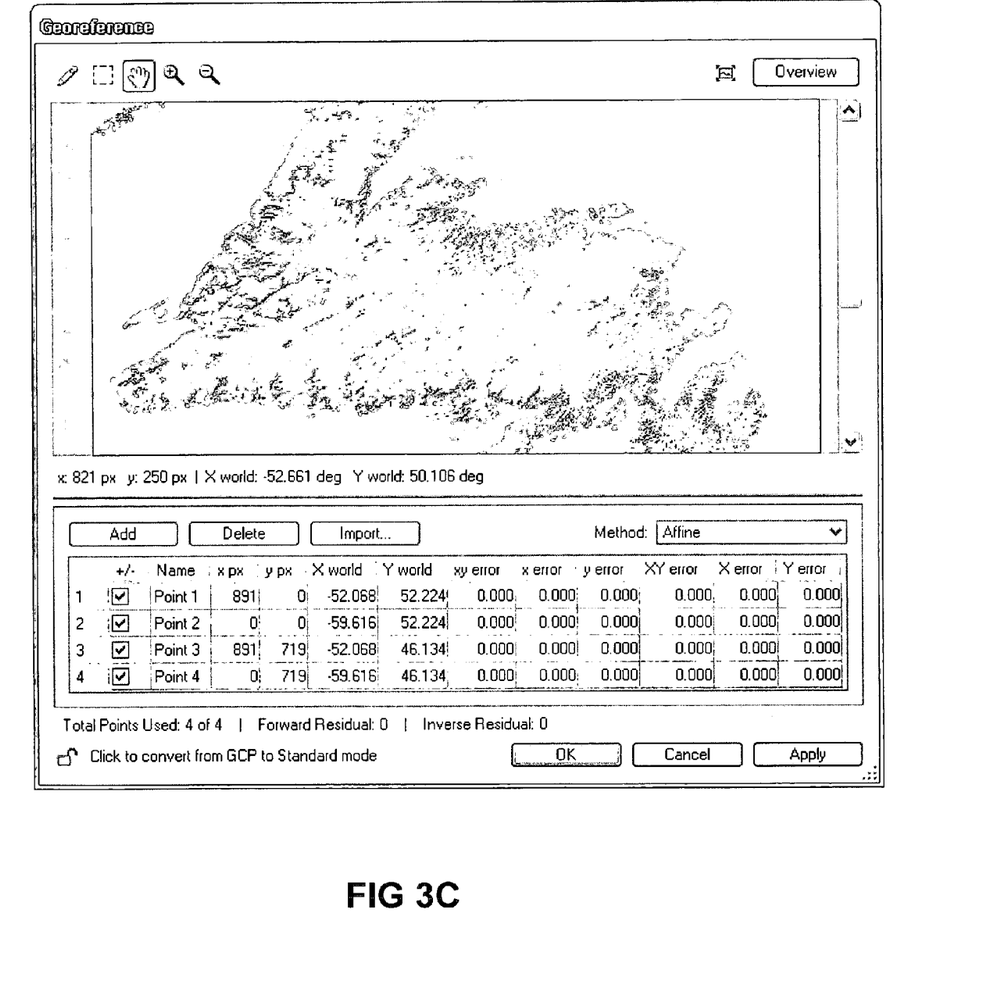

A second component of this invention enables the user to attach geospatial metadata to an image that does not already have such metadata. In many cases an image representing a portion of the earth may not have had its geospatial metadata previously calculated and/or assigned or the image and its geospatial metadata may have become separated. FIG. 3C shows a manner in which a user may manually assign known geographic locations to specific pixel locations on an image in order to have the invention calculate and assign the geospatial metadata, or georeference it.

Figure 3D:
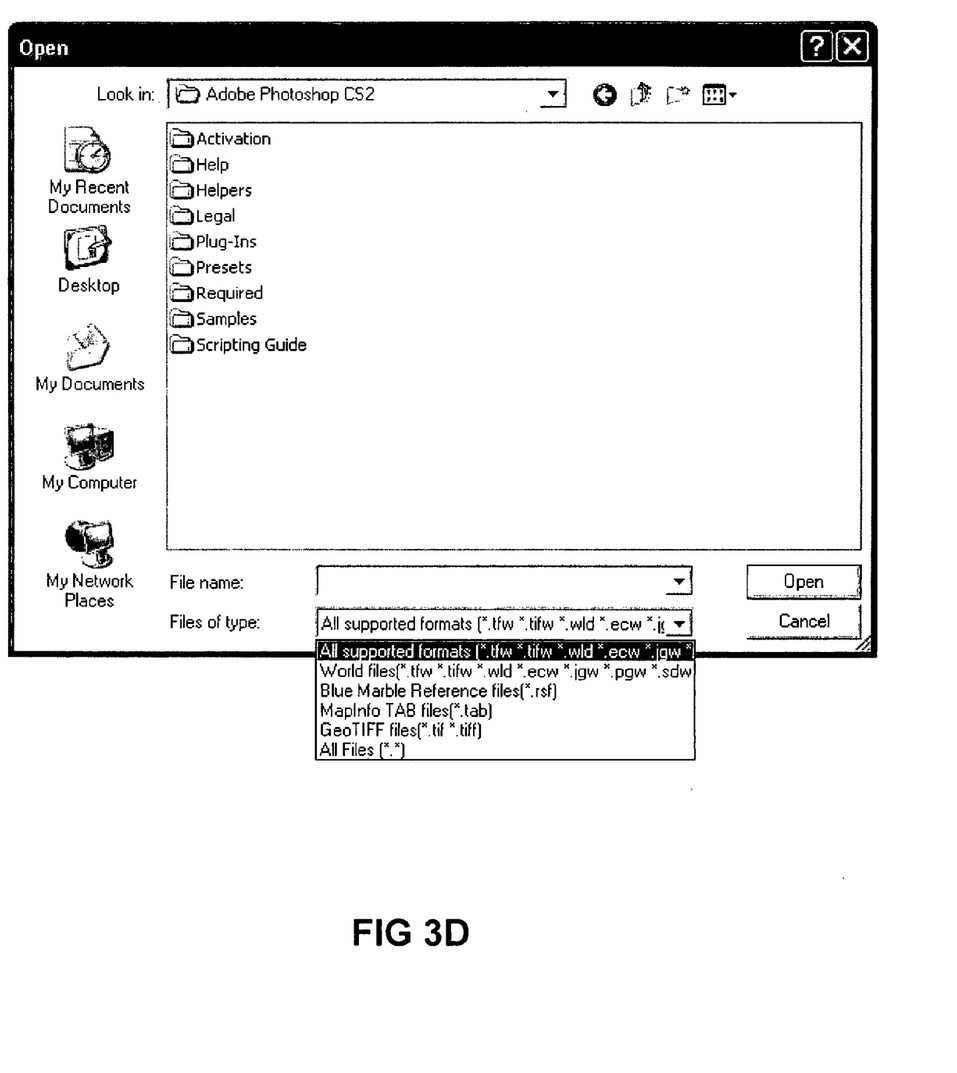

In some cases, an image may indeed have geospatial metadata related to it however the specific reference file containing the geospatial metadata may not have been detected by the software invention upon opening the image. In such cases this invention permits the user to manually direct the software to the location of the reference file containing the geospatial metadata. FIG. 3D shows the manner in which this invention allows the user to navigate to and select the reference file. Once the file is selected the geospatial metadata contained therein is read and the screens shown in FIGS. 3A and 3B are populated accordingly.

Figure 3E:
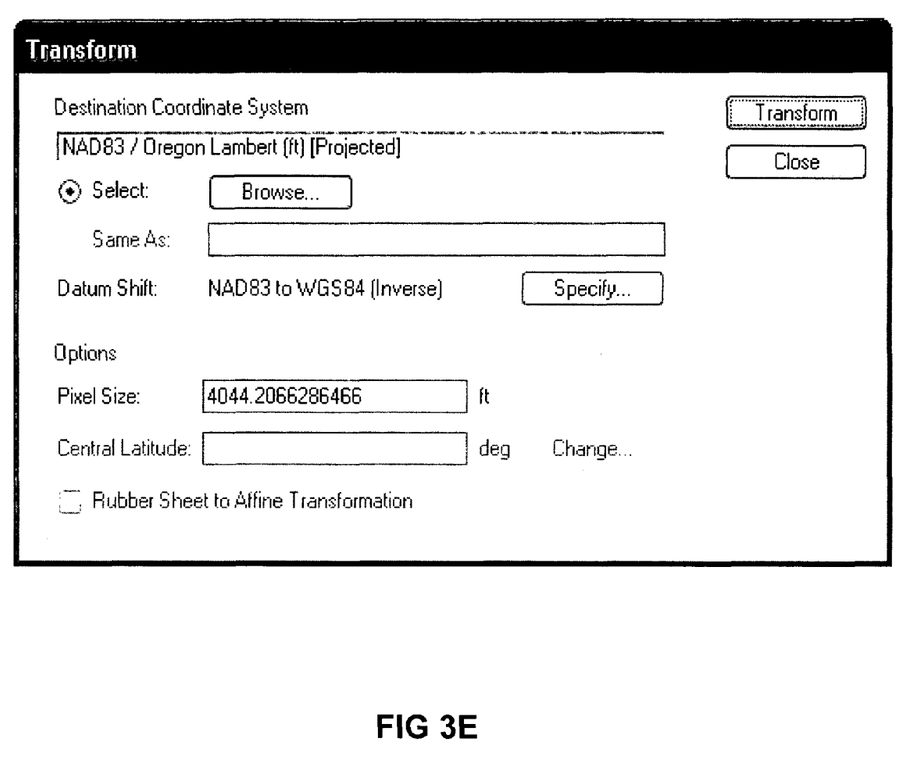

Another component of this invention allows both an image's geospatial metadata and pixels to be recalculated and re-rendered based on a number of complex geographic transformations more commonly known as projections. A projection is a vital part of displaying geographic data. "Projection" is a cartographic term for a mechanism (typically a mathematical algorithm) for portraying the spherical surface of the earth, or a portion thereof, on a flat surface. In displaying the earth on a flat surface some distortions of conformality, distance, direction, scale and area always result from the process; no projection is perfect. Different projections allow mapmakers to balance these various distortions, favoring one truth over another as best suited for a particular application. Every projection has advantages and disadvantages; for instance, some are better for depicting small areas while others are better for depicting large areas. There are hundreds of different projections in use today, each with its own unique formula and set of distortions. This particular component provides a mechanism for an image to be re-projected or visually transformed from one projection or co-ordinate system to another. In so doing this component a) allows the user to select the desired new co-ordinate system from a long list of possibilities (thousands) and if the desired one is not present allows the user to create their own, b) calculates the new pixel size and presents that value to the user, c) allows the user to specify a desired new pixel size in the event the calculated one is not suitable (ex. to accommodate rounding), d) transforms the image's pixels to the new projection and displays the new image and e) recalculates the new geospatial metadata values as per the new projection and repopulates the display show in FIGS. 3A and 3B accordingly. FIG. 3E is a screenshot showing the re-projection interface in the current embodiment.

Figure 3F:
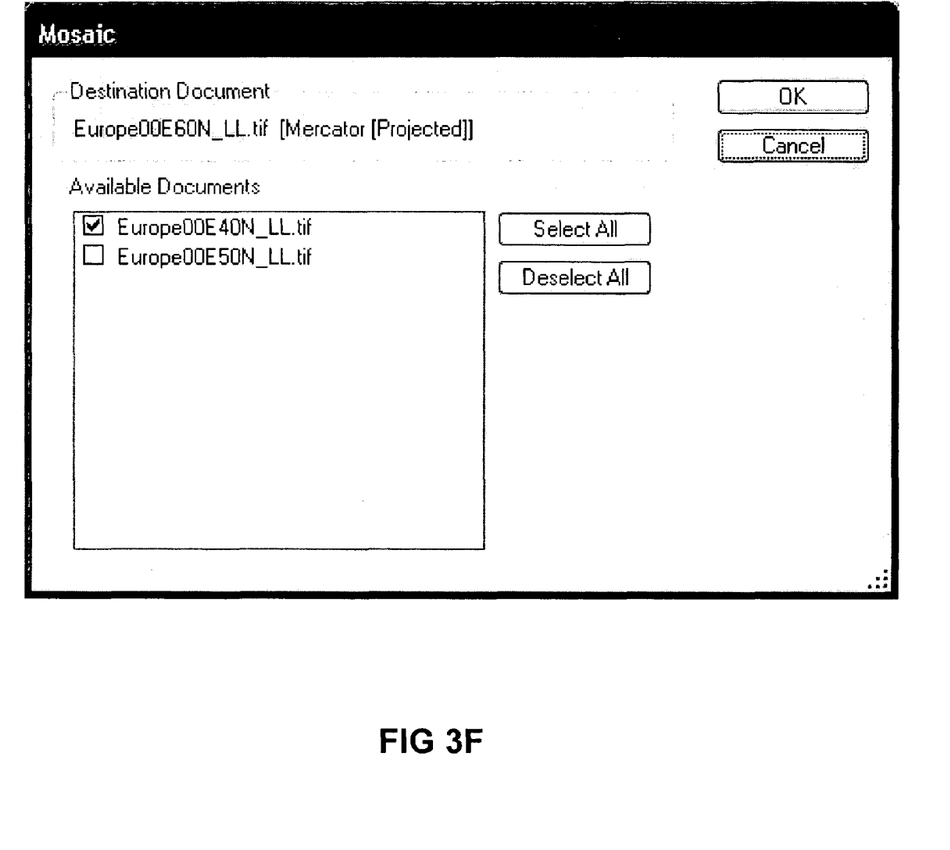

Another component of this invention allows the automatic joining of multiple spatial images together based upon their position on the earth. This process is more commonly known as mosaicking. In many cases a user may have more than one spatial image representing portions of a contiguous area, and may desire to combine these images into a large image. This component allows that process to be performed automatically. When evoked, the user is prompted by a dialog shown in FIG. 3F wherein all the currently open spatial images are listed. The user may then easily select the images from the list that he wishes to mosaic. Once the images have been selected the invention a) performs the mosaicking operation and displays the new larger image, b) calculates the new geospatial metadata based upon the new larger image and c) repopulates the display show in FIGS. 3A and 3B accordingly.

While specific embodiments of the present invention have been described, it should be noted that various modifications thereto can be made without departing from the spirit and scope of the invention as defined in the appended claims.

What is claimed is:

1. A method for enabling raster image editing software to work with geospatial imagery, said method comprising:
   identifying geospatial metadata for a raster image upon opening of said raster image;
   monitoring all raster image editing operations performed on said raster image to determine if said geospatial metadata is affected; and
   updating said geospatial metadata in conjunction with a raster image editing operation if said geospatial metadata is affected by the raster image editing operation,
   wherein said geospatial metadata comprises digital data that explicitly correlates the extent of the respective raster image to Earth-referenced geographic position data, and
   wherein updating said geospatial metadata includes recalculating said geospatial metadata based on changes to the raster image caused by said raster image editing operation to maintain the synchronization between the extent of the changed raster image and Earth-referenced geographic position data.

2. The method of claim 1 wherein identifying geospatial metadata comprises:
   detecting if said raster image has geospatial metadata logically associated therewith; and
   storing said geospatial metadata if any geospatial metadata is detected.

3. The method of claim 2 wherein identifying geospatial metadata comprises determining if a geo-reference file is available for said raster image if geospatial metadata is not detected in logical association with the raster image file itself.

4. The method of claim 3 wherein identifying geospatial metadata comprises allowing a user to select a geo-reference file if a geo-reference file is available and not automatically determined.

5. The method of claim 3 further comprising allowing a user to manually enter geospatial metadata for said raster image if a geo-reference file is not available or detected in logical association with the raster image file itself.

6. The method of claim 1 further comprising re-projecting said raster image from one projection or coordinate system to another and updating said geospatial metadata accordingly.

7. The method of claim 1 further comprising joining said raster image to another raster spatial image based upon their relative positions on Earth as determined by an analysis of geospatial metadata associated with each raster image.

8. The method of claim 1 further comprising splitting said raster image into multiple raster images based upon their relative positions on Earth and associating respective geospatial metadata with each.

9. The method of claim 1 wherein the geospatial metadata further comprises at least one of:
   a definition of the two-dimensional Earth surface area per raster image pixel; and
   an angle of rotation of the raster image with respect to an Earth-referenced coordinate system.

10. A non-transitory computer readable medium containing instructions for controlling a computer system to perform a method for enabling raster image editing software to work with geospatial imagery, wherein said method comprises:
    identifying geospatial metadata for a raster image upon opening of said raster image;
    monitoring all raster image editing operations performed on said raster image to determine if said geospatial metadata is affected; and updating said geospatial metadata in conjunction with a raster image editing operation if said geospatial metadata is affected by the raster image editing operation, wherein said geospatial metadata comprises digital data that explicitly correlates the extent of the respective raster image to Earth-referenced geographic position data, and wherein updating said geospatial metadata includes recalculating said geospatial metadata based on changes to the raster image caused by said raster image editing operation to maintain the synchronization between the extent of the changed raster image and Earth-referenced geographic position data.

11. The non-transitory computer readable medium of claim 10 wherein identifying geospatial metadata comprises:

detecting if said raster image has geospatial metadata logically associated therewith; and storing said geospatial metadata if any geospatial metadata is detected.

12. The non-transitory computer readable medium of claim 11 wherein identifying geospatial metadata comprises determining if a geo-reference file is available for said raster image if geospatial metadata is not detected in logical association with the raster image itself.

13. The non-transitory computer readable medium of claim 12 wherein identifying geospatial metadata comprises allowing a user to select a geo-reference file if a geo-reference file is available and not automatically determined.

14. The non-transitory computer readable medium of claim 12 wherein said instructions allow a user to manually enter geospatial metadata for said raster image if a geo-reference file is not available or detected in logical association with the raster image file itself.

15. The non-transitory computer readable medium of claim 10 wherein said instructions control a computer system to re-project said raster image from one projection or coordinate system to another and updating said geospatial metadata accordingly.

16. The non-transitory computer readable medium of claim 10 wherein said instructions control a computer system to join said raster image to another raster spatial image based upon their relative positions on Earth as determined by an analysis, by the computer system, of geospatial metadata associated with each raster image.

17. The non-transitory computer readable medium of claim 10 wherein said instructions control a computer system to split said raster image into multiple raster images based upon their relative positions on Earth and to associate respective geospatial metadata with each.

18. The non-transitory computer readable medium of claim 10, wherein the geospatial metadata further comprises at least one of:

a definition of the two-dimensional Earth surface area per raster image pixel; and an angle of rotation of the raster image with respect to an Earth-referenced coordinate system.

* * * * *